(12) United States Patent
Kellenberger et al.

(10) Patent No.: US 11,298,667 B2
(45) Date of Patent: Apr. 12, 2022

(54) PREPARATION VESSEL WITH A COOLING DEVICE

(71) Applicant: Vorwerk & Co. Interholding GmbH, Wuppertal (DE)

(72) Inventors: Michel Kellenberger, Stadel bei Winterthur (CH); Stefan Stahl, Zurich (CH)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 179 days.

(21) Appl. No.: 16/502,151

(22) Filed: Jul. 3, 2019

(65) Prior Publication Data
US 2020/0009520 A1   Jan. 9, 2020

(30) Foreign Application Priority Data
Jul. 5, 2018   (DE) ..................... 10 2018 116 336.3

(51) Int. Cl.
| | |
|---|---|
| *B01F 35/92* | (2022.01) |
| *A47J 43/046* | (2006.01) |
| *A47J 43/07* | (2006.01) |
| *F25B 21/02* | (2006.01) |
| *B01F 35/90* | (2022.01) |
| *B01F 101/00* | (2022.01) |

(52) U.S. Cl.
CPC ............ *B01F 35/92* (2022.01); *A47J 43/046* (2013.01); *A47J 43/0716* (2013.01); *F25B 21/02* (2013.01); *B01F 2035/98* (2022.01); *B01F 2101/1805* (2022.01); *F25B 2321/023* (2013.01)

(58) Field of Classification Search
CPC ............... F25B 21/02; F25B 2321/02; F25B 2321/023; F25B 2321/025
See application file for complete search history.

(56) References Cited

U.S. PATENT DOCUMENTS

| | | | | |
|---|---|---|---|---|
| 5,255,520 A | * | 10/1993 | O'Geary | F25B 21/02 62/3.2 |
| 8,759,721 B1 | * | 6/2014 | Alexander | A47J 27/21083 219/432 |
| 9,447,995 B2 | * | 9/2016 | Bloedow | F25D 3/005 |

(Continued)

FOREIGN PATENT DOCUMENTS

| | | |
|---|---|---|
| BR | 8505264 A | 5/1987 |
| CN | 205358065 U | 7/2016 |

(Continued)

*Primary Examiner* — Elizabeth J Martin
*Assistant Examiner* — Evan J. Cusick
(74) *Attorney, Agent, or Firm* — Collard & Roe, P.C.

(57) ABSTRACT

A preparation vessel, in particular for a food processor, has a vessel wall and a preparation area surrounded by the vessel wall. The vessel wall has a cooling device that contacts the vessel wall in a heat-conducting manner for cooling a preparation item present in the preparation area. The vessel wall in at least a partial area has a double-walled design, with an inner wall bordering the preparation area and an outer wall that is formed separately from the inner wall and spaced apart from the inner wall by a gap, wherein the gap has the cooling device and a phase change material located between the cooling device and the outer wall as viewed in a direction from the preparation area to the outer wall.

7 Claims, 3 Drawing Sheets

(56) References Cited

U.S. PATENT DOCUMENTS

| | | | |
|---|---|---|---|
| 2006/0150637 A1* | 7/2006 | Wauters | B67D 1/0869 |
| | | | 62/3.64 |
| 2013/0221013 A1 | 8/2013 | Kolowich et al. | |
| 2014/0290301 A1* | 10/2014 | Law | F24F 5/0021 |
| | | | 62/404 |
| 2015/0033764 A1* | 2/2015 | Gurevich | H01L 35/30 |
| | | | 62/3.6 |
| 2015/0143818 A1* | 5/2015 | Eckhoff | F28D 15/04 |
| | | | 62/3.2 |
| 2015/0159924 A1* | 6/2015 | Calderon | F25D 11/006 |
| | | | 62/3.6 |
| 2016/0114297 A1* | 4/2016 | Perez | F25B 39/02 |
| | | | 366/182.2 |
| 2016/0215194 A1 | 7/2016 | Narine et al. | |
| 2016/0243000 A1* | 8/2016 | Gray | F25D 3/08 |
| 2019/0174945 A1 | 6/2019 | Oti | |

FOREIGN PATENT DOCUMENTS

| | | | |
|---|---|---|---|
| DE | 3921115 A | 1/1991 | |
| EP | 0 133 844 A1 | 3/1985 | |
| EP | 3 501 353 A1 | 6/2019 | |
| GB | 2 144 208 A | 2/1985 | |
| GB | 2 304 179 A | 3/1997 | |
| JP | S60-160847 A | 8/1985 | |
| WO | 2006/010538 A1 | 2/2006 | |
| WO | 2007/135130 A1 | 11/2007 | |
| WO | WO-2007135130 A1 * | 11/2007 | A23G 9/222 |

\* cited by examiner

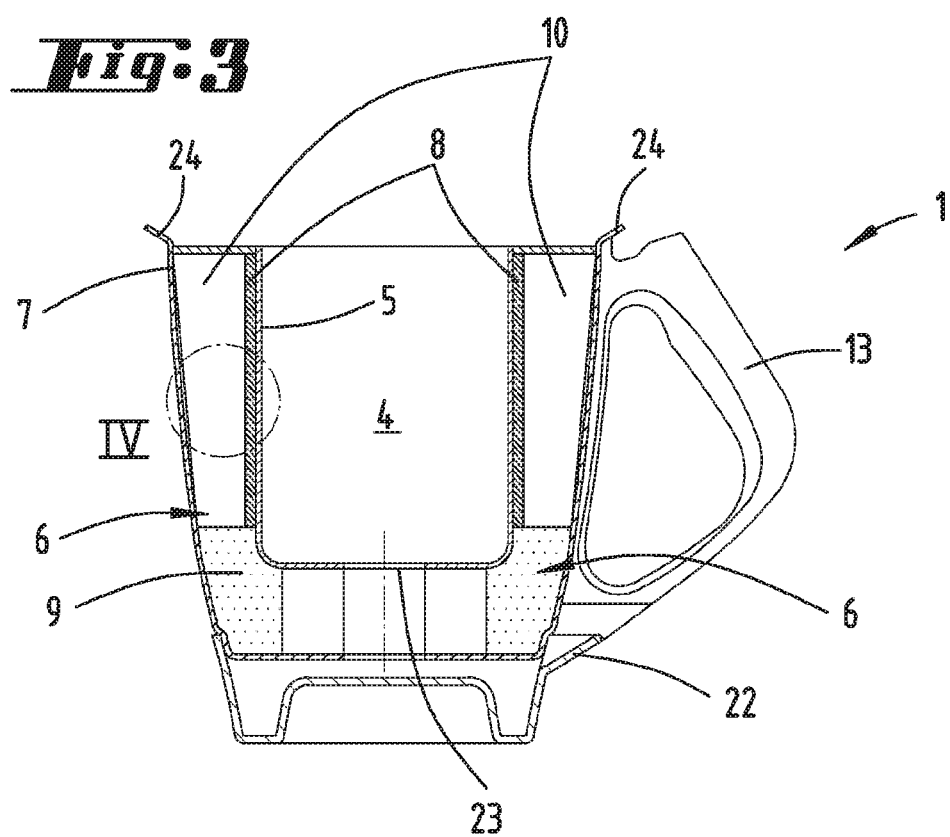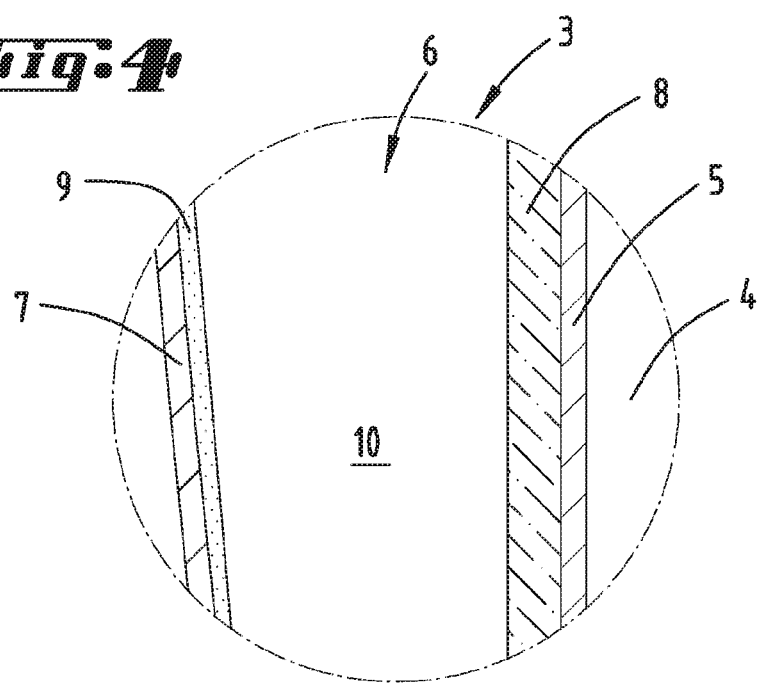

PREPARATION VESSEL WITH A COOLING DEVICE

CROSS-REFERENCE TO RELATED APPLICATIONS

This application claims priority under 35 USC 119 of German Application No. 10 2018 116 336.3, filed on Jul. 5, 2018, the disclosure of which is herein incorporated by reference.

BACKGROUND OF THE INVENTION

1. Field of the Invention

The invention relates to a preparation vessel, in particular for a food processor, wherein the preparation vessel has a vessel wall and a preparation area surrounded by the vessel wall, wherein the vessel wall has allocated to it a cooling device that contacts the vessel wall in a heat-conducting manner for cooling a preparation item present in the preparation area.

The invention further relates to a food processor with a base device and a preparation vessel that can be connected with the base device, wherein the base device and the preparation vessel have corresponding electrical contacts for supplying power to electrical consumers of the preparation vessel via a power source of the base device.

2. The Prior Art

Preparation vessels as well as food processors with such preparation vessels are known in the art.

For example, Publication WO 2007/135130 A1 discloses a food processor, specifically an ice cream machine, with a cooling device in the form of a Peltier element allocated to a vessel wall. The Peltier element is connected with the vessel wall with its cooling side, and is cooled on its warm side by means of a cooling circuit, which carries a heat transfer medium. An additional Peltier element can be allocated to the cooling circuit for cooling purposes.

Even though such a food processor is suitable for preparing ice creams or other cool or frozen preparation items, for example, the provision of a separate cooling circuit in which a heat transfer medium is circulated makes it expensive to manufacture and relatively large.

SUMMARY OF THE INVENTION

Therefore, the object of the present invention is to propose a preparation vessel and also a food processor that enable a cooling of the preparation vessel without the preparation vessel or food processor having to be equipped with a cooling circuit, which requires an electric pump.

To achieve this object, it is first proposed that the vessel wall of the preparation vessel consist of two walls in at least one partial area, with an inner wall bordering the preparation area and an outer wall that is formed separately from the latter and spaced apart from the inner wall by a gap, wherein the gap has the cooling device and a phase change material (PCM, phase change material) located between the cooling device and the outer wall as viewed in a direction from the preparation area to the outer wall.

According to the invention, the preparation vessel now has a double-walled vessel wall, which incorporates the cooling device for cooling the inner wall on the one hand, and a phase change material on the other for directing the heat from the cooling device to the outer wall of the preparation vessel. Viewed in the direction from the preparation area to the outside of the preparation vessel, the vessel wall first has the inner wall, then the cooling device, thereafter the phase change material, and finally the outer wall, in that sequence, wherein the cooling device and the phase change material are located inside of the gap of the double-walled vessel wall. The cooling device relays the thermal energy taken out of the preparation area to the phase change material, which is able to absorb the thermal energy due to the high specific heat capacity for phase change materials. As opposed to prior art, it is no longer necessary to cool the cooling device or preparation area by forming a cooling circuit, which is driven by an electrical pump. Rather, both the cooling device and the phase change material can be introduced into the vessel wall itself, specifically in the gap between an inner wall and an outer wall of the vessel wall. As a consequence, the preparation vessel according to the invention can be designed for connection with a base device of a food processor and draw electrical power for the cooling device, for example, from a power source of the base device of the food processor, or be a preparation vessel that is designed as a "standalone device" and has its own power supply, so that the preparation vessel as such is ready for use as is, without the assistance of other devices.

Phase change materials, also referred to as latent heat storage materials, have specific heat capacities of greater than 2 kJ/(kg K). The phase change materials are characterized in that they can store thermal energy at a low loss and for a long time. The latent melting heat, i.e., the absorbable quantity of thermal energy, in the range of the transition temperature characteristic for the respective phase change material is significantly greater than the quantity of thermal energy that can be stored outside of the phase transformation effects based on the specific heat capacity of the material. In everyday objects, for example, these phase change materials are used in heat cushions and cold packs. The heat storage media are used applying their phase transition from solid to liquid and vice versa. While the heat storage medium is being charged with thermal energy, the heat storage medium is melted, wherein a great deal of thermal energy can be absorbed. The stored quantity of thermal energy is released during the solidification of the heat storage medium, wherein the large quantity of thermal energy absorbed beforehand is again released into the environment as solidification heat. The advantage to phase change materials is that a large quantity of thermal energy can be stored in a relatively small mass in a small temperature range prescribed by the transition temperature. In addition, because metastable states of the heat storage medium are used, the thermal energy can also be stored without any thermal insulation, or less than for materials in which no transition effect is used in terms of heat storage, and with very low losses. In turn, the release of stored thermal energy from the phase change material can then be achieved by cooling down the preparation vessel in a refrigerator, for example, or by heating a medium located in the preparation area, such as water.

It is proposed that the phase change material be spaced apart from the inner wall by interspersing the cooling device. In this embodiment, the phase change material preferably has no direct contact with the inner wall of the preparation vessel, so that heat transfer from the preparation area to the phase change material takes place exclusively via the cooling device. However, it is not out of the question that the vessel wall have both partial areas where the inner wall is directly contacted by the phase change material, and partial areas where at least a partial area of the cooling device is arranged between the phase change material and the inner wall.

In particular, it is proposed that the cooling device be a Peltier element. The cooling device can consist of several Peltier elements arranged one after the other in the circumferential direction of the vessel wall, so that the majority of Peltier elements annularly envelop the preparation area. The Peltier elements are in contact with the inner wall of the preparation vessel in a thermally conductive manner, for which purpose a thermally conductive gel or a thermally conductive paste can be used. A Peltier element consists of two ceramic plates, which are connected by p- and n-doped semiconductor elements, wherein the p- and n-doped semiconductors are interconnected with each other in alternating pairs via contact points. If a current is passed through two contact points of the p- and n-conductor lying one behind the other, thermal energy is absorbed at one contact point, and thermal energy is emitted at the other contact point. Which side of the Peltier element then gets cold and which side gets warm here depends on the current direction. If the warm side of the Peltier element is then cooled, for example here by means of the phase change material, which draws thermal energy from the warm side, the opposite cold side of the Peltier element is cooled down further. As a result, an even lower temperature can be achieved inside of the preparation area of the preparation vessel. In order to regenerate the phase change material, i.e., to emit the absorbed thermal energy, the current direction through the Peltier element can preferably be changed, so that the heat-emitting side then is in contact with the inner wall, and can there be emitted into a cool medium, for example cold water. The phase change material is then once again available for absorbing thermal energy. Alternatively, however, the preparation vessel as a whole can be placed in a cold store or refrigerator, for example, in order to cool down the phase change material. As an alternative to being configured as a Peltier element, however, the cooling device can in an especially simple case also just be a heat sink, for example with cooling ribs, which contacts the inner wall of the preparation vessel. For example, this heat sink can be designed integrally and/or materially uniform with the inner wall of the preparation vessel, and especially preferably consist of a readily heat conducting material, for example a food-safe metal.

In combination with a cooling device designed as a Peltier element, it is also proposed that a heat sink be arranged on the side of the Peltier element facing away from the inner wall. In this case as well, the heat sink can be a heat sink that has cooling ribs, for example. The heat sink is used for advantageously diverting the thermal energy from the warm side of the Peltier element, so that the warm side of the Peltier element is cooled down, as a result of which the cool side of the Peltier element, which abuts against the inner wall of the preparation vessel, can become even colder. It is recommended that the heat sink provide as large a cooling surface as possible, for example via a plurality of adjacently arranged cooling ribs, between which the phase change material is arranged. As a consequence, the thermal energy can be optimally transmitted.

In addition, it is proposed that the phase change material have a specific heat capacity of greater than 2 kJ/(kg K). In particular, the phase change material can have a specific heat capacity of greater than 4 kJ/(kg K). As a result, the largest possible quantity of thermal energy can be stored inside of the gap, which is then correspondingly extracted from the preparation area of the preparation vessel. The phase change material can likewise be designed as a phase change material polymer composition. The polymers used for the composition are preferably polyethylenes, in particular low density polyethylenes (LDPE), for example comprised of diblock and triblock copolymers. These compositions are advantageously low-exudation or no-exudation, mechanically fixed and dimensionally stable, and have an improved thermal conductivity. In addition, the phase change material can also be water, which has an especially high specific heat capacity of 4.182 kJ/(kg K). For example, when water freezes, i.e., during the phase transition from liquid to solid, roughly the same quantity of thermal energy is released as required when heating the same quantity of water from 0° C. to 80° C. Phase change materials other than water are also possible, for example dipotassium hydrogen phosphate hexahydrate or sodium acetate trihydrate.

In this conjunction, it is proposed in particular that the phase change material have a transition temperature that is greater than −10° C. and less than 25° C., in particular greater than 5° C. and less than 20° C. These transition temperatures advantageously lie in the same temperature range that is advantageous for meals to be cooled in the preparation area. Transition temperatures of less than 5° C. can be advantageous, in particular to include negative transition temperatures, for example to achieve a freezing of a preparation item inside of the preparation area. In this case, the phase change material can preferably be manufactured based upon paraffin or salt, so that the transition temperature lies under 0° C., for example, preferably measuring up to minus 10° C.

In addition, it is proposed that the gap have several phase change materials with transition temperatures that differ from each other. This makes it possible to advantageously increase the operating range of the cooled preparation vessel.

In addition, it is proposed as advantageous that a volume of the phase change material located in the gap be roughly as large as a volume of the preparation area. In particular, it is recommended that the volume of the phase change material be 0.75 to 1.25 times as large as the volume of the preparation area. These volume ratios have proven to be especially advantageous in quickly and effectively cooling a preparation item located inside of the preparation area. In a preparation area having a volume of 1.2 l, for example, a volume lying within a range of 1.0 l to 1.3 l is recommended for the phase change material.

Finally proposed apart from the preparation vessel described above as well is a food processor, which has a base device and a preparation vessel that can be connected with the base device, wherein the base device and the preparation vessel have corresponding electrical contacts for supplying power to electrical consumers of the preparation vessel from a power source of the base device, and wherein the preparation vessel is designed according to one of the embodiments described above, and the cooling device is an electrical consumer of the preparation vessel.

For example, the food processor can be a combined cooker/mixer, which has a heating device for the preparation vessel and an electric motor for driving an agitator extending into the preparation vessel. The preparation vessel and the base device have corresponding electrical contacts, which when the preparation vessel is connected with the base device allow power to be supplied to the electrical consumers of the preparation vessel via the base device. An electrical consumer of the preparation vessel is here the Peltier element described above, which is used to cool the vessel wall or a preparation item located inside of the preparation area.

BRIEF DESCRIPTION OF THE DRAWINGS

The invention will be explained in greater detail below based upon exemplary embodiments. In the drawings:

FIG. 3 is a longitudinal section of the preparation vessel by itself, FIG. 4 is a magnified partial area of a vessel wall of the preparation vessel.

DESCRIPTION OF THE EMBODIMENTS

Figure 1:
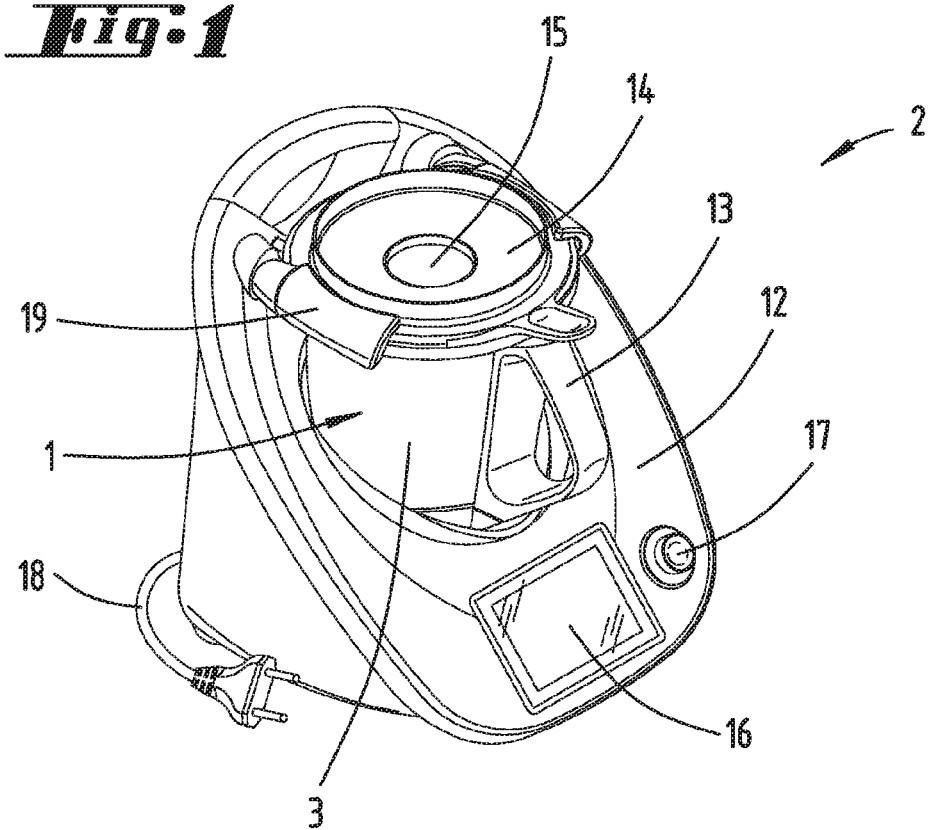
FIG. 1 is a food processor according to the invention with a preparation vessel according to the invention.

FIG. 1 only exemplarily shows an electric motor-driven food processor 2, which is here designed as a combined cooker/mixer. The food processor 2 has a base device with a housing 12, with which a preparation vessel 1 is detachably connected. The housing 12 has a display 16 and a switch 17, which can be utilized by a user to operate the food processor 2. For example, the user can initiate a recipe selection and make inputs for controlling the food processor 2 via the display 16 designed as a touchscreen and the switch 17. Further arranged on the housing 12 are locking elements 19, which serve to lock the preparation vessel 1 with a cover element 14. The locking elements 19 are here locking rollers that can rotate around a longitudinal axis, which engage over an edge 24 of the preparation vessel 1 (see FIG. 3) and the cover element 14, so as to lock the latter with each other. The cover element 14 further has a central opening 15, through which a user can introduce ingredients into the preparation vessel 1 and observe the preparation status of the preparation item. During a preparation process, the central opening 15 is usually closed with a measuring cup (not shown), so that the preparation item cannot squirt out of the preparation vessel 1. The food processor 2 further has an electric cable 18 for power supply, which can be connected in the usual manner with the household power supply.

Figure 2:
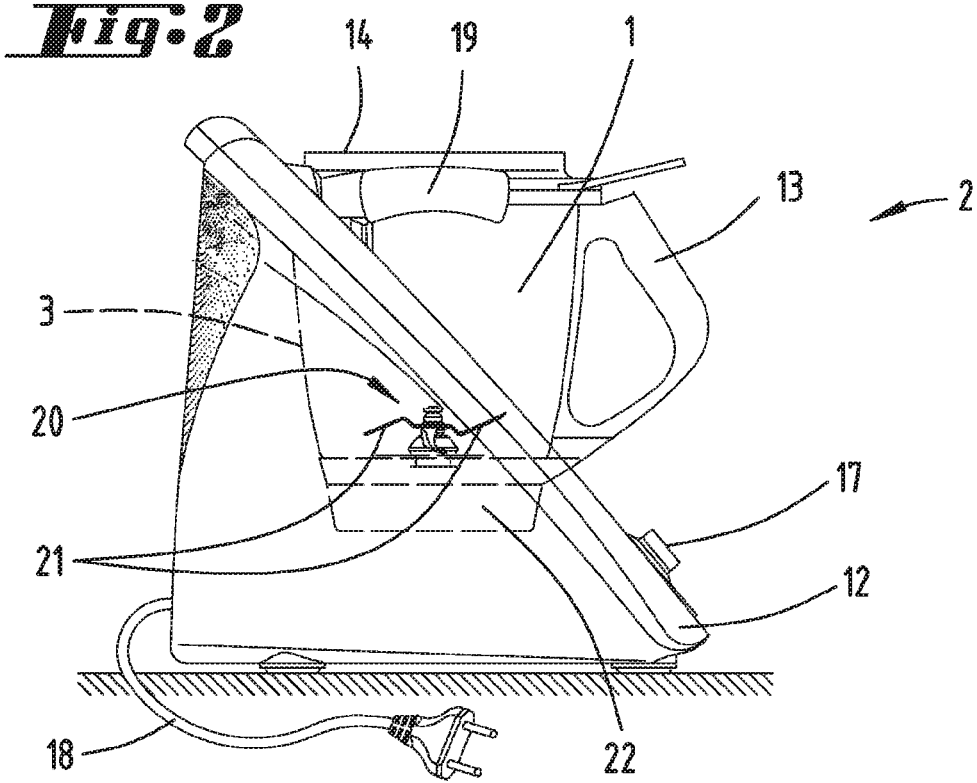
FIG. 2 is a side view of the food processor with the preparation vessel.

For example, the preparation vessel 1 is here designed as a mixing vessel. As shown on FIG. 2, the latter has an agitator 20, which extends through a floor opening 23 (see FIG. 3) of the preparation vessel 1 and into a preparation area 4 of the preparation vessel 1. The agitator 20 is connected with an electric motor rotary drive of the food processor 2. The agitator 20 has a plurality of blades 21, which are suitable for comminuting or mixing preparation items. Further arranged on the floor of the preparation vessel 1 is a foot part 22, which simultaneously serves to fix the agitator 20 on the preparation vessel 1. Further arranged on a vessel wall 3 of the preparation vessel 1 is a handle 13, which the user can grip, for example to remove the preparation vessel 1 from the food processor 2 or place it back into the food processor 2.

As shown in greater detail on FIGS. 3 to 6, the vessel wall 3 of the preparation vessel 1 has a double-walled design, and has an inner wall 5 that faces the preparation area 4 and an outwardly facing outer wall 7. A gap 6 is formed between the inner wall 5 and outer wall 7. The gap 6 has a cooling device 8 that is in thermally conductive contact with the inner wall 5. The cooling device 8 here consists of a plurality of Peltier elements, which annularly envelop the preparation area 4 of the preparation vessel 1.

Adjoined to the side of the cooling device 8 facing away from the inner wall 5 are a plurality of heat sinks 10, which each have several cooling ribs 11. Further located in the gap 6, adjoining both the cooling device 8 and the heat sink 10, is a phase change material 9, which has a volume corresponding to roughly the volume of the preparation area 4.

Figure 5:
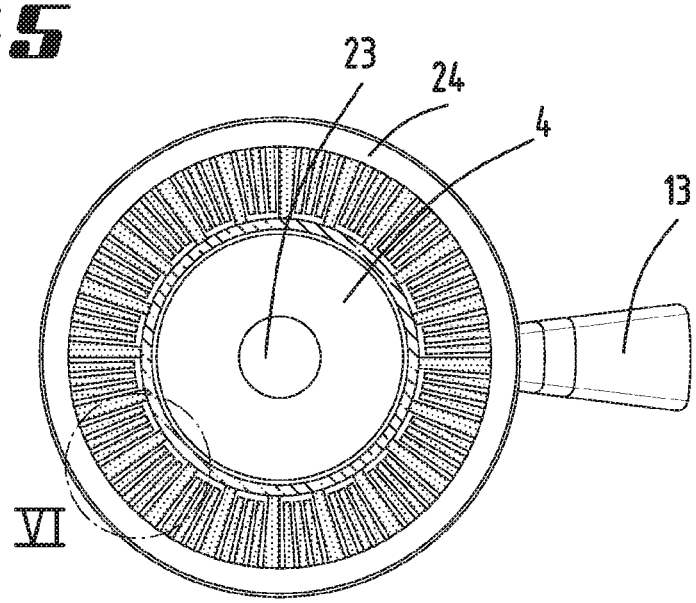
FIG. 5 is a cross section of the preparation vessel.
Figure 6:
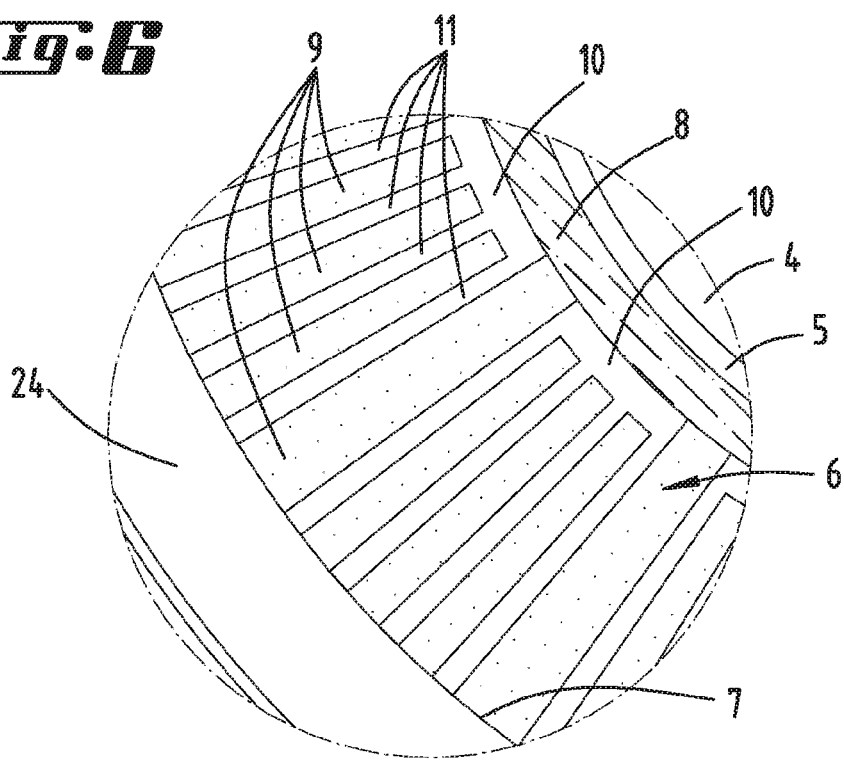
FIG. 6 is a magnified partial area of the preparation vessel according to FIG. 5.

Discernible in particular from FIGS. 5 and 6 is how the phase change material 9 also extends between the cooling ribs 11 of the heat sink 10, and thereby ensures an optimal heat dissipation from the heat sink 10 or cooling device 8 and the inner wall 5 of the preparation vessel 1. In order to be able to cool preparation items located in the preparation area 4 to a temperature below room temperature, the phase change material 9 preferably has a transition temperature below room temperature, here for example in the range of 10° C. If necessary, two different phase change materials 9 can be used at the same time, so as to expand the operating range of the cooled preparation vessel 1.

The cooling power and efficiency of the cooling device 8 here comprised of Peltier elements depend heavily on a temperature difference between the hot and cold side of the cooling device 8. Using the phase change material 9 on the hot side of the Peltier elements makes it possible to significantly increase the cooling power and efficiency of the Peltier elements by comparison to ambient air-cooled Peltier elements given the same cold side temperature. In particular for preparing ice cream, for example, a higher temperature difference may be required between the hot and cold side of the cooling device 8, which could not be achieved with conventional, ambient air-cooled Peltier element systems.

In order to make the temperature difference is large as possible, the phase change material 9 is preferably pre-cooled. This can be done either by storing the preparation vessel 1 in a cold store or refrigerator, or by heating up a medium, e.g., water, inside the preparation area 4 of the preparation vessel 1, so that heat stored in the phase change material 9 can be transferred to the water located in the preparation area 4.

REFERENCE LIST

1 Preparation vessel
2 Food processor
3 Vessel wall
4 Preparation area
5 Inner wall
6 Gap
7 Outer wall
8 Cooling device
9 Phase change material
10 Heat sink
11 Cooling rib
12 Housing
13 Handle
14 Cover element
15 Opening
16 Display
17 Switch
18 Electric cable
19 Locking element
20 Agitator
21 Blade
22 Foot part
23 Floor opening
24 Edge

The invention claimed is:

1. A preparation vessel comprising a vessel wall, a preparation area surrounded by the vessel wall, and a cooling device allocated to the vessel wall, the cooling device contacting the vessel wall in a heat-conducting manner for cooling a preparation item present in the preparation area, wherein the vessel wall in at least a partial area has a double-walled design, with an inner wall bordering the preparation area and an outer wall that is formed separately from the inner wall and spaced apart from the inner wall by a gap, wherein the cooling device is disposed in the gap, and further comprising a phase change material in the gap, the phase change material being located between the cooling device and the outer wall as viewed in a radial direction from the preparation area to the outer wall, wherein the cooling device is located between the phase change material and the inner wall, wherein a plurality of adjacent heat sinks are arranged consecutively in a circumferential direction of the preparation vessel and on a side of the cooling device facing away from the inner wall, wherein the phase change material adjoins both the cooling device and the heat sinks, wherein each of the plurality of heat sinks have several cooling ribs extending longitudinally in the radial direction of the preparation vessel, and wherein the phase change material also extends between adjacent cooling ribs of each of the plurality of heat sinks, and wherein the heat sinks are spaced from one another by portions of the phase change material that extend in the radial direction from the cooling device to the outer wall.

2. The preparation vessel according to claim 1, wherein the cooling device is a Peltier element.

3. The preparation vessel according to claim 1, wherein the phase change material has a specific heat capacity of greater than 2 kJ/(kg K).

4. The preparation vessel according to claim 3, wherein the phase change material has a transition temperature that is greater than −10° C. and less than 25° C.

5. The preparation vessel according to claim 3, wherein the gap has several phase change materials with transition temperatures that differ from each other.

6. The preparation vessel according to claim 1, wherein a volume of the phase change material is 0.75 to 1.25 times as large as a volume of the preparation area.

7. A food processor comprising a base device and a preparation vessel according to claim 1 that is configured to be connected with the base device, wherein the base device and the preparation vessel have corresponding electrical contacts for supplying power to electrical consumers of the preparation vessel from a power source of the base device, wherein the cooling device is an electrical consumer of the preparation vessel.

* * * * *